(12) United States Patent  
Huang et al.

(10) Patent No.: US 9,075,577 B2  
(45) Date of Patent: Jul. 7, 2015

(54) ELECTRONIC APPARATUS AND KEYBOARD THEREOF

(71) Applicant: Acer Incorporated, New Taipei (TW)

(72) Inventors: Chih-Hung Huang, New Taipei (TW); Chih-Chun Liu, New Taipei (TW); Chien-Yun Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 189 days.

(21) Appl. No.: 13/896,320

(22) Filed: May 16, 2013

(65) Prior Publication Data

US 2014/0254080 A1 Sep. 11, 2014

(30) Foreign Application Priority Data

Mar. 5, 2013 (TW) .............................. 102107732 A

(51) Int. Cl.
 *G06F 1/16* (2006.01)

(52) U.S. Cl.
 CPC ............ *G06F 1/1662* (2013.01); *G06F 1/1616* (2013.01); *G06F 1/1624* (2013.01)

(58) Field of Classification Search
 USPC ........... 345/168, 169, 156, 172, 1.1, 1.3, 419, 345/633, 175, 179; 361/679.12, 679.17, 361/679.08, 679.01, 679.16, 679.09, 361/679.55, 679.56, 679.3, 679.27, 679.06, 361/679.4, 679.2, 679.26, 679.29, 679.14; 248/126, 917, 918, 276.1; 16/308, 366, 16/342, 239, 258, 354; 455/550.1, 556.1, 455/575.3, 575.4, 556.2, 466, 410, 575.1; 312/322, 223.1, 223.2, 223.3
 See application file for complete search history.

(56) References Cited

U.S. PATENT DOCUMENTS

| | | | |
|---|---|---|---|
| 5,494,447 A | 2/1996 | Zaidan | |
| 2008/0084396 A1* | 4/2008 | Pen | ................................ 345/168 |
| 2008/0101003 A1* | 5/2008 | Lin | ................................ 361/683 |
| 2010/0053877 A1 | 3/2010 | Hsu et al. | |
| 2011/0312392 A1* | 12/2011 | Reeves et al. | ............... 455/575.3 |

FOREIGN PATENT DOCUMENTS

| | | |
|---|---|---|
| CN | 201153275 | 11/2008 |
| CN | 201781710 | 3/2011 |
| CN | 102131361 | 7/2011 |

* cited by examiner

*Primary Examiner* — Hung Duong  
(74) *Attorney, Agent, or Firm* — Jianq Chyun IP Office

(57) ABSTRACT

An electronic apparatus includes a first body, a second body, a keyboard, at least one pair of body linkages and at least one pair of keyboard linkages. The second body is pivoted at the first body and has a second side facing the first body. The keyboard is adjacent to and movable connected to the second body. The keyboard side of the keyboard and the second side are located at the same side. The body linkages are protruded from the first side and movably connected to the second body. The keyboard linkages are opposite to each other and movably disposed at the keyboard and two side-edges of the second body. When the first body is extended relatively to the second body, the keyboard is able to move to a side of the second body near to the first body.

11 Claims, 6 Drawing Sheets

ELECTRONIC APPARATUS AND KEYBOARD THEREOF

CROSS-REFERENCE TO RELATED APPLICATION

This application claims the priority benefit of Taiwan application serial no. 102107732, filed on Mar. 5, 2013. The entirety of the above-mentioned patent application is hereby incorporated by reference herein and made a part of this specification.

BACKGROUND OF THE INVENTION

1. Field of the Invention

The invention generally relates to a keyboard, and more particularly, to a keyboard able to be flipped over and moved.

2. Description of Related Art

Along with the continuous progress of science and technology, more complex and more user-friendly electronic products are ceaselessly upgraded. Taking a computer as an example, in living and working of common people, the computer has gradually become an indispensable tool. A notebook computer has the same functionality as a general desktop computer, but the notebook computer features small size and light weight to allow a user to carry on quite easily. In addition, in recent years, with the progress of touch technology and the rapid development of various applications of electronic products, touch devices have become very popular. Along with the updating of the operating system, the operating system used in notebook computers also gradually began to use touch panel as the primary input device.

In recent years, the notebook design trend is focused on thinning electronic apparatuses. In order to suit an operation system introducing touching function, combining a notebook computer with a tablet computer has become an inevitable trend. For example, when the first body (screen) of a notebook computer is flipped over to the back of the second body and is folded with the second body, the notebook computer gives an appearance similar to a shape of a tablet computer. However, when the first body (screen) of an electronic apparatus is flipped over to the back of the second body (host), the keyboard on the surface of the second body may be exposed, which easily increases the chance for a user to scratch the keyboard due to carelessness or produces the problem of falling off the keys.

SUMMARY OF THE INVENTION

Accordingly, the invention is directed to a keyboard able to be covered by a first body thereof to get protected in non-use status and be moved to the front of a display side thereof by linkages in operation status.

The invention is also directed to an electronic apparatus with the above-mentioned keyboard where the display side faces the outside of the body to avoid the keyboard from being exposed.

In the invention, the keyboard is adjacent to and movably connected to a second body of the electronic apparatus, and the keyboard is located at a side of the second body far away from the place where the second body is pivoted to the first body. The electronic apparatus includes a first body and the second body, the first body has a first side and a display side opposite to each other. The second body is pivoted at the first body and has a second side facing the first body. At least one pair of body linkages is protruded from the first side of the first body and movably connected to the second body. At least one pair of keyboard linkages is opposite to each other and movably disposed at two side-edges of the keyboard and both side-edges of the second body. The keyboard has a keyboard side located at the same side of the second side, in which when the first body is extended relatively to the second body, the keyboard is able to move along a first direction relatively to the second body, then clockwise move to a side of the second body where the second body is pivoted to the first body by means of the rotations of the pair of the keyboard linkages, and then to move along the first direction again to be fixed.

The electronic apparatus of the invention includes a first body, a second body, a keyboard, at least one pair of body linkages and at least one pair of keyboard linkages. The first body has a first side and a display side opposite to each other. The second body is pivoted at the first body, in which the second body has a second side facing the first body. The keyboard is adjacent to and movably connected to the second body, in which the keyboard is located at a side of the second body far away from the place where the second body is pivoted to the first body. The keyboard has a keyboard side, and the keyboard side and the second side are located at the same side. The body linkages are protruded from the first side of the first body and movably connected to the second body. The keyboard linkages are opposite to each other and movably disposed at both sides of the keyboard and both sides of the second body. When the first body is extended relatively to the second body, the keyboard is able to move along a first direction relatively to the second body, then clockwise move to a side of the second body where the second body is pivoted to the first body by means of the rotations of the pair of the keyboard linkages, and then move along the first direction again to be fixed.

Based on the description above, in the electronic apparatus of the invention, the keyboard thereof is movably connected to a side of the second body. When the first body thereof is folded to the second body to serve as a tablet computer, the keyboard is able to be covered by the first body to get protection; when the first body is extended relatively to the second body to serve as a notebook computer, the keyboard can move to the front of the display side of the first body by the keyboard linkages, followed by being fixed at another side of the second body. As a result, the electronic apparatus of the invention can make the keyboard fixed at different positions for operation in different application statuses so as to avoid the keyboard in non-use status from being exposed to damage the appearance thereof or to make the keys fall off.

In order to make the features and advantages of the present invention more comprehensible, the present invention is further described in detail in the following with reference to the embodiments and the accompanying drawings.

DESCRIPTION OF THE EMBODIMENTS

Figure 1A:
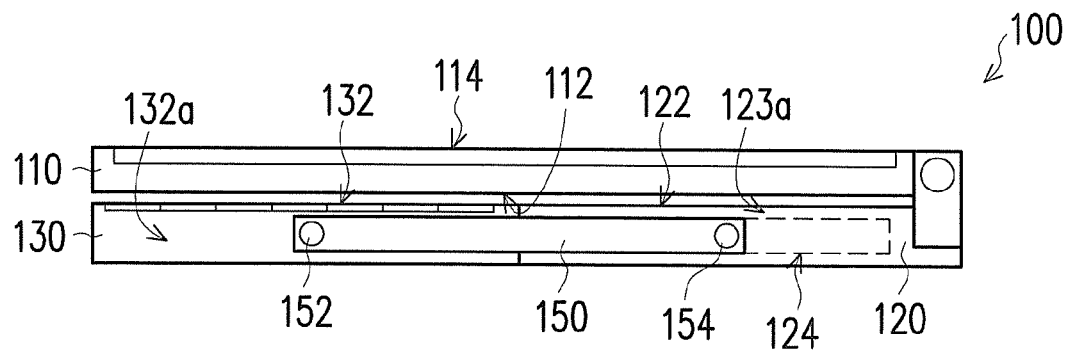
FIG. 1A is a schematic diagram of an electronic apparatus according to an embodiment of the invention.
Figure 1B:
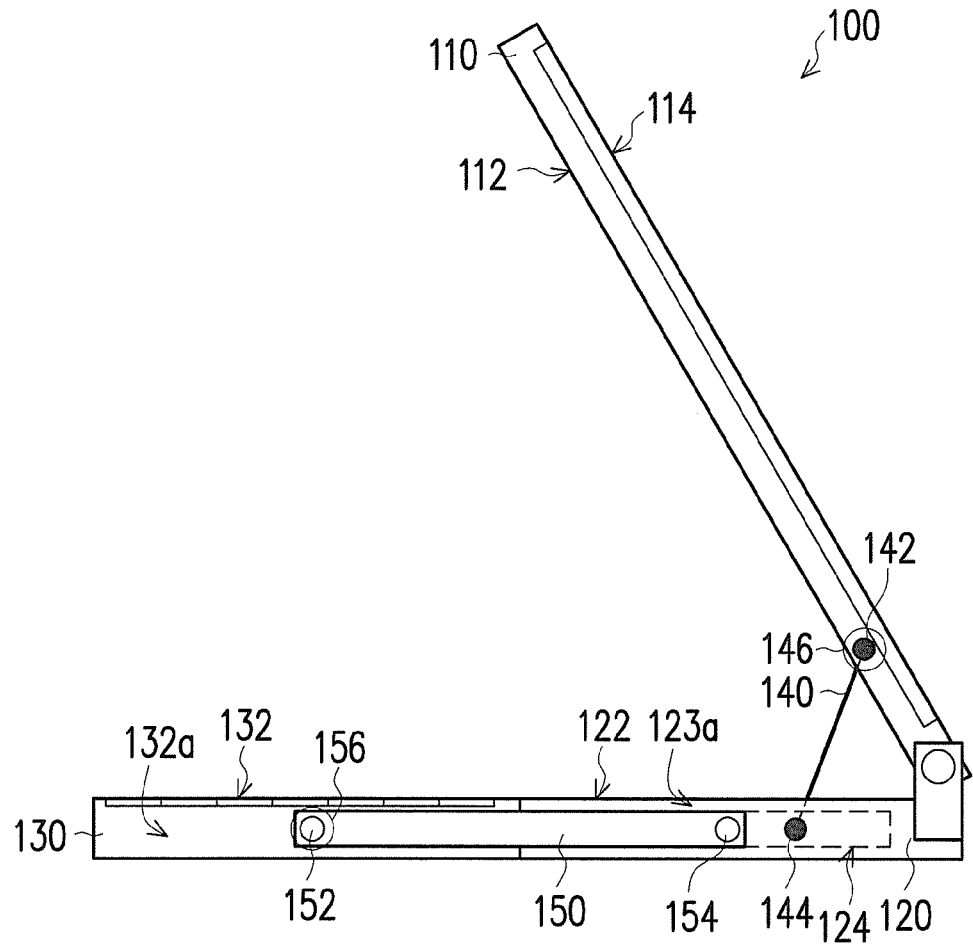
FIG. 1B is a diagram showing the electronic apparatus of FIG. 1A in extended status.

FIG. 1A is a schematic diagram of an electronic apparatus according to an embodiment of the invention and FIG. 1B is a diagram showing the electronic apparatus of FIG. 1A in extended status. Referring to FIGS. 1A and 1B, an electronic apparatus 100 of the embodiment includes a first body 110, a second body 120, a keyboard 130, at least one pair of body linkages 140 and at least one pair of keyboard linkages 150. The first body 110 has a first side 112 and a display side 114 opposite to each other. The second body 120 is pivoted at the first body 110 and has a second side 122 facing the first body 110. The keyboard 130 is adjacent to and connected to the second body 120. In FIGS. 1A and 1B, the keyboard 130 is located at a side of the second body 120 far away from the place where the second body 120 is pivoted to the first body 110. The keyboard 130 has a keyboard side 132 and the keyboard side 132 and the second side 122 are located at the same side. The body linkages 140 are protruded from the first side 112 of the first body 110 and movably connected to the second body 120. The keyboard linkages 150 are opposite to each other and movably disposed at two side-edges 132a of the keyboard 130 and two side-edges 123a of the second body 120.

In the statuses of FIGS. 1A and 1B, the display side 114 of the electronic apparatus 100 faces the outside of the first body 110 and is, for example, a touch screen. Thus, when the electronic apparatus 100 is in folding status, the electronic apparatus 100 can serve as a tablet computer. In addition, since the keyboard side 132 and the second side 122 are located at the same side, and the keyboard 130 is far away from a side of the second body 120 where the second body 120 is pivoted to the first body 110, when the electronic apparatus 100 is in folding status to serve as a tablet computer, the keyboard 130 can be covered by the first body 110 to get protection (as shown in FIG. 1A) to avoid the keys from being scratched or falling off. When the first body 110 is extended relatively to the second body 120 as the status of FIG. 1B, the first body 110 can be upright to provide the user with a better enjoyably viewing-angle. The body linkages 140 can assist in pivoting the rotation shafts of the first body 110 and the second body 120 to support the extended angle of the first body 110 relative to the second body 120 and avoid the first body 110 from screen shake due to touching the display side 114 by the user.

Figure 1C:
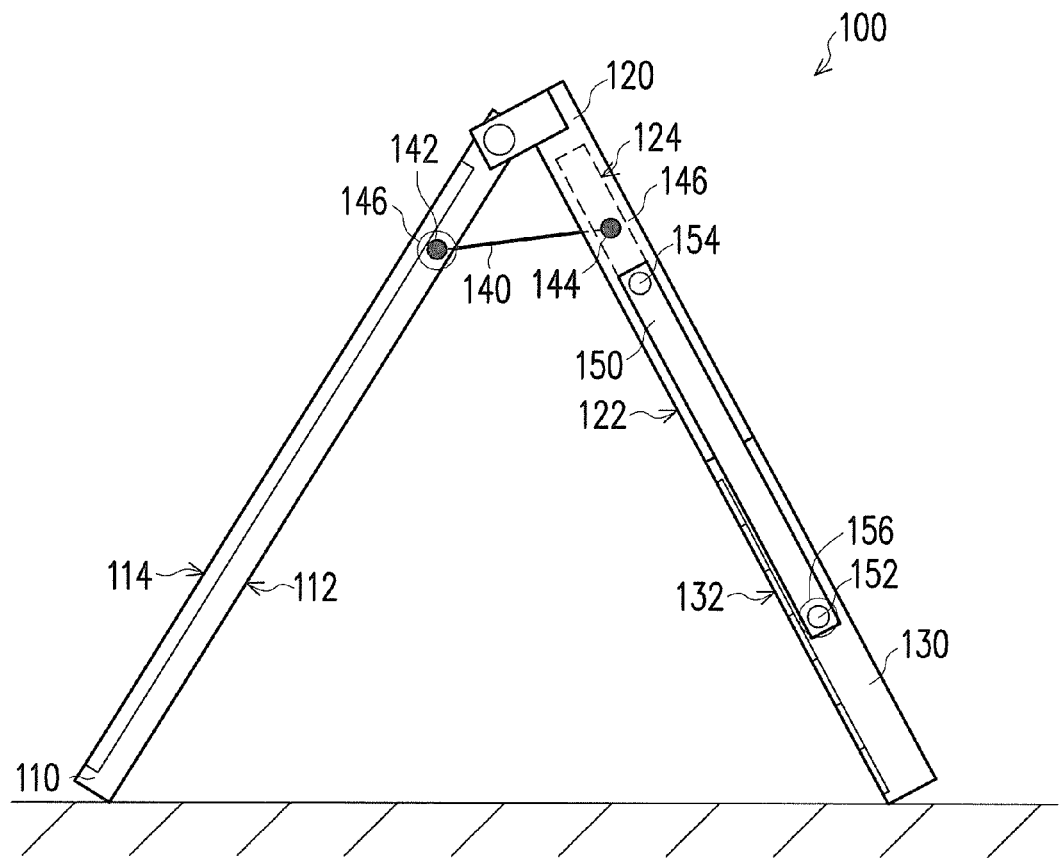
FIG. 1C is a diagram showing the electronic apparatus of FIG. 1B in different operation statuses.

However, the embodiment herein does not limit the placing way when the electronic apparatus 100 serves as a tablet computer. FIG. 1C is a diagram showing the electronic apparatus 100 of FIG. 1B in different operation statuses. In FIG. 1C, the electronic apparatus 100 in extended status can be flipped over on the desktop for the user to enjoyably view. In order to avoid the surface wearing of the first body 110 and the second body 120, the appearance treatment of the first body 110 and the second body 120 can be implemented by adopting spraying with leather paint in a higher film thickness, which the embodiment is not limited to. In other unshown embodiments of the invention, it can dispose supporting foot-pads (not shown) on the first body and the second body to avoid undermining the appearance.

Figure 2A:
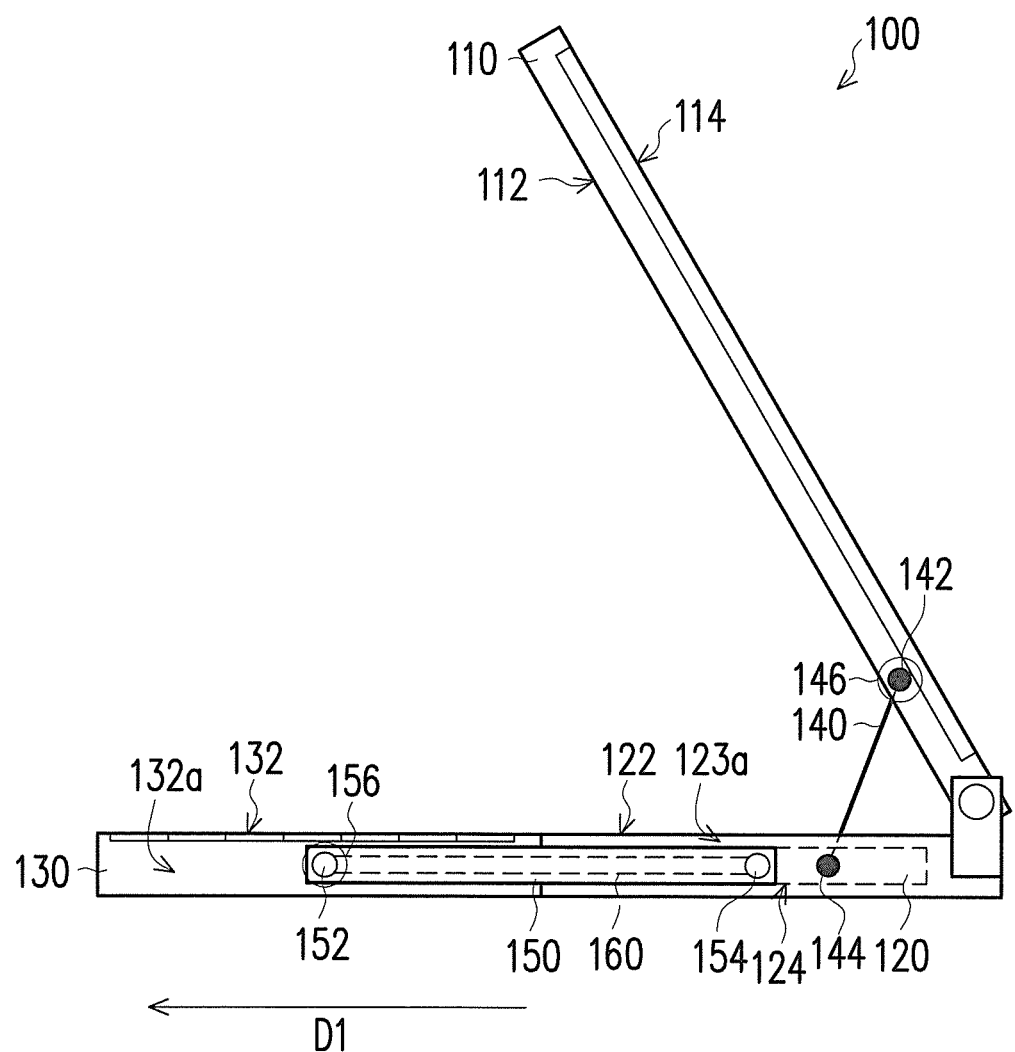
FIGS. 2A-2C are diagrams showing the electronic apparatus of FIG. 1B in another operation status.
Figure 2B:
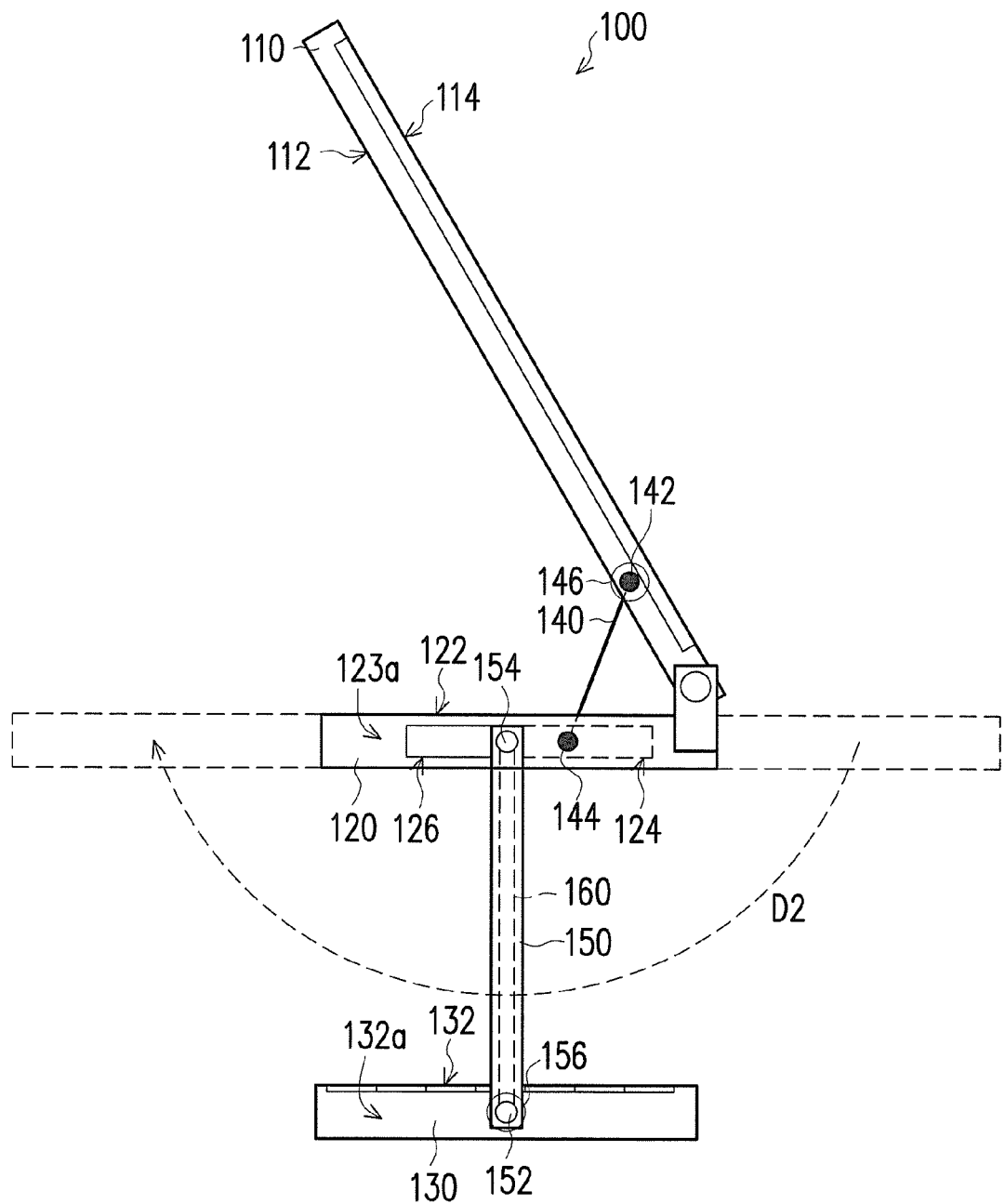
Figure 2C:
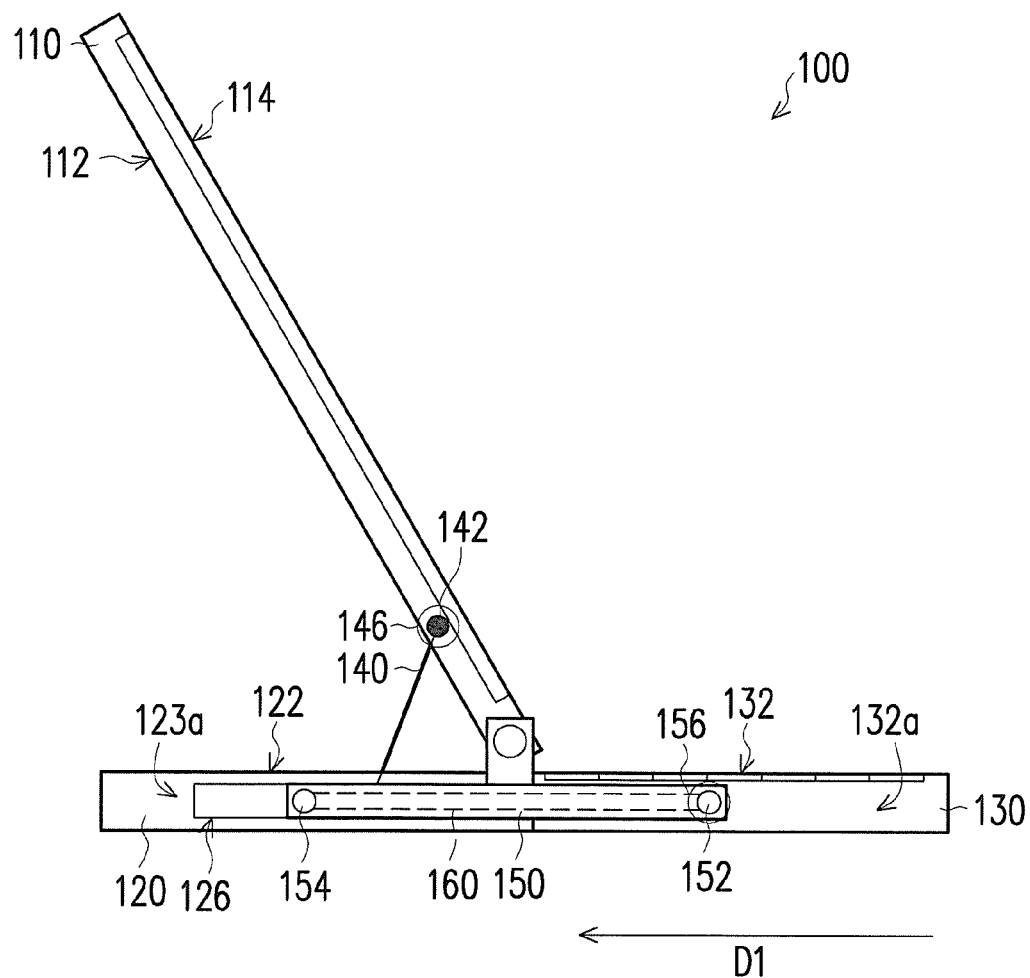

FIGS. 2A-2C are diagrams showing the electronic apparatus of FIG. 1B in another operation status. Referring to FIGS. 2A-2C, in addition to serve as a tablet computer, the electronic apparatus 100 of the embodiment can serve as a notebook computer. In more details, when the first body 110 is extended relatively to the second body 120, the keyboard 130 can move relatively to the second body 120 along a first direction D1, then clockwise move to a side of the second body 120 where the second body 120 is pivoted to the first body 110 by means of the rotations of the keyboard linkages 150 in a clockwise direction D2, then move again in the first direction D1 to be fixed. In FIGS. 2A-2C, the keyboard 130 can move to the front of the display side 114 through the keyboard linkages 150 so that the electronic apparatus 100 at the time serves as a notebook computer. In short, the electronic apparatus 100 of the embodiment not only can avoid scratching or falling off the keyboard due to protrusion of the keyboard 130 when serving as a tablet computer, but also can serve as a notebook computer by changing the relative position between the keyboard 130 and the second body 120.

Continuing to FIGS. 1A-1C, in the embodiment, the second body 120 further includes at least one pair of first chutes 124 (the figures only give out a single side viewing where the chutes are marked in hidden lines), and the first chutes 124 are corresponding to the body linkages 140 and disposed at a region of the second side 122 near to the first body 110. Accordingly, each of the body linkages 140 includes a first supporting point 142 and a second supporting point 144 opposite to each other. The first supporting point 142 is pivoted at the first body 110 and the second supporting point 144 is correspondingly and slidably disposed at the first chutes 124. In other words, in the embodiment, the body linkages 140 act similarly to a planar slider system. When the first body 110 is extended relatively to the second body 120, the body linkages 140 can rotate relatively to the first body 110 by means of the first supporting points 142 and drive the second supporting points 144 moving in the first chutes 124, which enables the body linkages 140 forming an included angle towards the first body 110 and assists in supporting the first body 110.

After making the first body 110 extended, in order to fix the angle of the first body 110, each body linkage 140 further includes a first torque part 146 disposed at the first supporting points 142. The first torque parts 146 function to fix the extended angle of the first body 110 relative to the second body 120. The first torque part 146 is, for example, a structure with multiple stopping points so as to make the first body 110 fixed at different extended angles. However, the invention does not limit the structure form of the torque part 146.

Continuing to FIGS. 2A-2C, in the embodiment, the keyboard 130 is adjacent to the second body 120 and connected to each other through the keyboard linkages 150. In the embodiment, the second body 120 further includes at least one pair of second chutes 126 disposed at both side-edges 123a in the second body 120 connected to the second side 122 and corresponding to the keyboard linkages 150. Accordingly, each of the keyboard linkage 150 includes a third supporting point 152 and a fourth supporting point 154 opposite to each other. Each of the third supporting point 152 is pivoted at the corresponding side-edge 132a in the keyboard 130 connected to the keyboard side 132, and each of the third supporting point 152 is respectively at the center of the corresponding side-edge 132a of the keyboard 130. Each of the fourth supporting point 154 is correspondingly and slidably disposed at the corresponding second chute 126. When the keyboard 130 moves along the first direction D1 relatively to the second body 120, the keyboard 130 brings the fourth supporting points 154 moving in the second chutes 126.

In other words, after the first body 110 is extended relatively to the second body 120, first, the keyboard 130 brings the keyboard linkages 150 moving along the first direction D1 relatively to the second body 120, then, rotates to the front of the display side 114 relatively to the second body 120 around the fourth supporting points 154 as circle center, and then moves again along the first direction D1 to close to the second body 120, so that the electronic apparatus 100 at the time is in the status to serve as a notebook computer. In addition, each of the keyboard linkage 150 further includes a second torque part 156 disposed at the third supporting point 152. The second torque parts 156 function to fix the angle of the keyboard 130 relative to the second body 120 and avoid the shake of the keyboard 130 during the rotation of the keyboard 130 relatively to the second body 120. The second torque part 156 has the same structure form as the first torque part 146, which is omitted to describe.

The embodiment herein does not limit the connection relationships between the keyboard 130, the keyboard linkages 150 and the second body 120, and does not limit the second chutes 126 to be located at the second body 120. In other unshown embodiments of the invention, the second chutes can be disposed on the keyboard as well, and the keyboard linkages at the time are pivoted to the second body. The keyboard linkages can be telescopic rods and the both ends of each of the body linkage are respectively pivoted at the second body and the keyboard. By elongations of the keyboard linkages, the keyboard can move relatively to the second body, and the keyboard can rotate relatively to the second body by using the keyboard linkages.

In the embodiment, the keyboard 130 can be electronically connected to the second body 120 in wire way or wireless way, so as to deliver the input instructions of the keyboard 130 to the second body 120. For example, the electronic apparatus 100 further includes at least one transmission line 160, and the transmission line 160 is out of the fourth supporting point 154 where the second body 120 is connected to the keyboard linkage 150. The transmission line 160 is assembled in the keyboard linkage 150, followed by connecting the keyboard 130 via the third supporting point 152, which the invention is not limited to. In other unshown embodiments of the invention, the keyboard can be a wireless keyboard, which functions also to transmit information with the second body.

Figure 3:
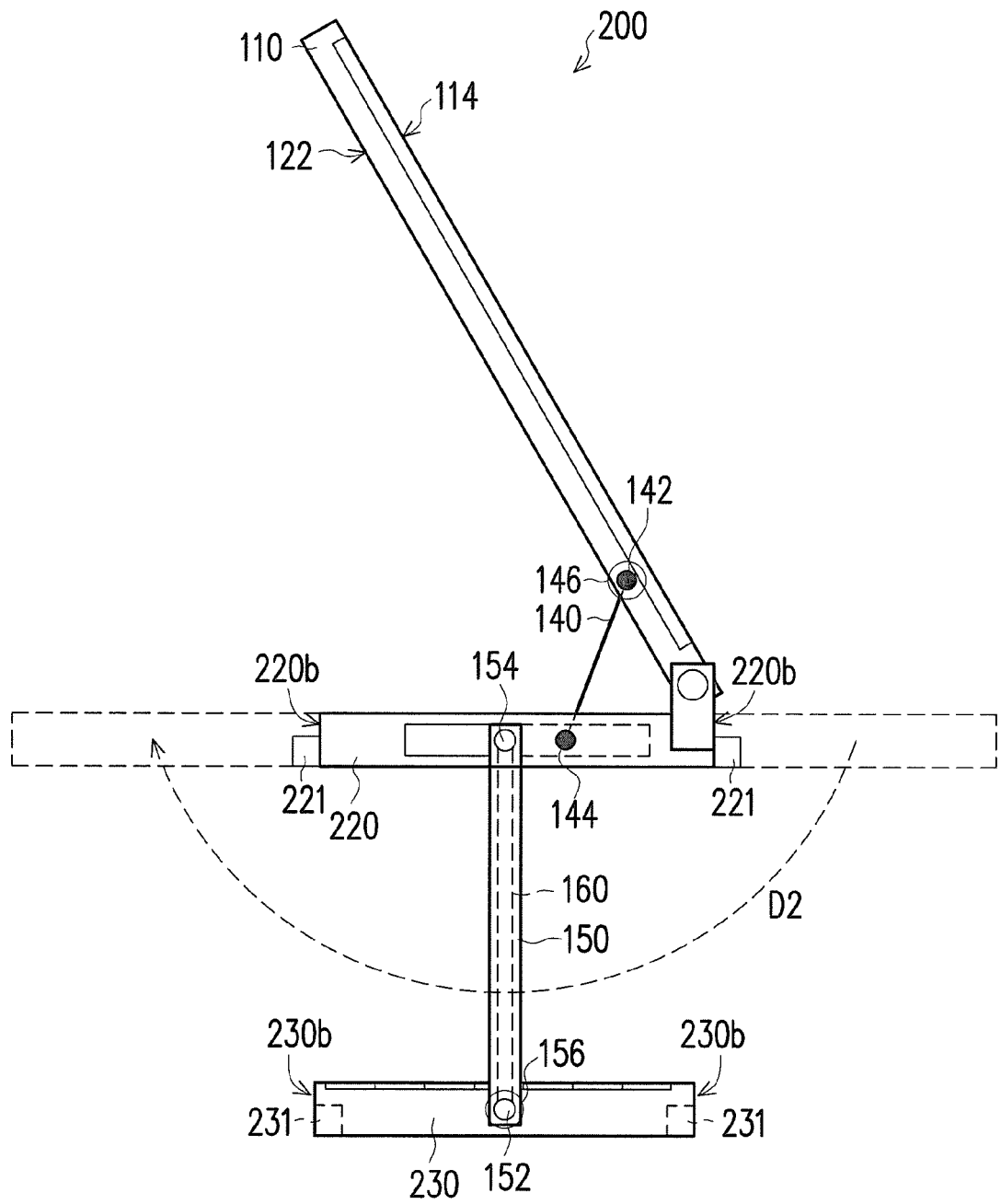
FIG. 3 is a schematic diagram of an electronic apparatus in the status of FIG. 2B according to another embodiment of the invention.

In addition, magnets (not shown) can be respectively disposed between the keyboard 130 and the second body 120 for adsorbing each other and positioning, which can fix the relative position between the keyboard 130 and the second body 120 without shaking when the electronic apparatus 100 serves as a tablet computer or a notebook computer. The invention herein does not limit to use the magnets between the keyboard 130 and the second body 120 to get mutual positioning. Another embodiment in the following is given to explain the fixing way between the keyboard and the second body. FIG. 3 is a schematic diagram of an electronic apparatus in the status of FIG. 2B according to another embodiment of the invention. In FIG. 3, further two first positioning portions 221 are respectively disposed on two body side-edges 220b of the second body 220 where the keyboard 230 can be adjacent to the second body 220; two second positioning portions 231 are also correspondingly and respectively disposed on two keyboard side-edges 230b of the keyboard 230 where the second body 220 can be adjacent to the keyboard 230. By means of the mutual-fixing of the second positioning portion 231 and the first positioning portion 221, the keyboard 230 fixes the relative position between the keyboard 230 and the second body 220. For example, each of the second positioning portions 231 has a plurality of concave portions on each of the keyboard side-edges 230b of the keyboard 230, and each of the first positioning portions 221 has a plurality of convex potions on each of the body side-edges 220b of the second body 220. When the convex portions and the concave portions get structure interference, the relative position between the keyboard 230 and the second body 220 is fixed to avoid produce steps.

In summary, in the electronic apparatus of the invention, the keyboard thereof is movably connected to a side of the second body. When the first body thereof is folded to the second body to serve as a tablet computer, the keyboard is able to be covered by the first body to get protection; when the first body is extended relatively to the second body to serve as a notebook computer, the keyboard can move to the front of the display side of the first body by the keyboard linkages, followed by being fixed at another side of the second body. In addition, the relative position between the second body and the keyboard can be fixed to get positioning by using magnets or a positioning structure. The electronic connection between second body and the keyboard can be realized by disposing a transmission line on a keyboard linkage or adopting a wireless keyboard. Thus, the electronic apparatus of the invention can make the keyboard fixed at different positions for operation in different application statuses so as to avoid the keyboard in non-use status from being exposed to damage the appearance thereof or to make the keys fall off.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An electronic apparatus, comprising:
a first body, having a first side and a display side opposite to each other;
a second body, pivoted at the first body, wherein the second body has a second side facing the first body; and
a keyboard, adjacent to and movably connected to the second body, wherein the keyboard is located at a side of the second body far away from the place where the second body is pivoted to the first body, the keyboard has a keyboard side, and the keyboard side and the second side are located at the same side;
at least one pair of body linkages, protruded from the first side of the first body and movably connected to the second body; and
at least one pair of keyboard linkages, opposite to each other and movably disposed at two side-edges of the keyboard and two side-edges of the second body, wherein when the first body is extended relatively to the second body, the keyboard is able to move along a first direction relatively to the second body, then clockwise move to a side of the second body where the second body is pivoted to the first body by means of the rotations of the pair of the keyboard linkages, and then move along the first direction again to be fixed.

2. The electronic apparatus as claimed in claim 1, wherein the second body further comprises:
at least one pair of first chutes, disposed correspondingly to the pair of body linkages at an edge region of the second side near the first body.

3. The electronic apparatus as claimed in claim 2, wherein each of the body linkages comprises a first supporting point and a second supporting point opposite to each other, the first supporting point is pivoted at the first body and the second supporting point is correspondingly and slidably disposed at the first chutes.

4. The electronic apparatus as claimed in claim 3, wherein each of the body linkage further comprises a first torque part disposed at the first supporting point, and the first torque part is used to fix an angle of the first body relative to the second body.

5. The electronic apparatus as claimed in claim 1, wherein the second body further comprises:

at least one pair of second chutes disposed at the side-edges in the second body connected to the second side and corresponding to the pair of the keyboard linkages.

6. The electronic apparatus as claimed in claim 5, wherein each of the keyboard linkage has a third supporting point and a fourth supporting point opposite to each other, the third supporting point is pivoted at the corresponding side-edge in the keyboard connected to the keyboard side, and the fourth supporting point is correspondingly and slidably disposed at the second chute, and when the keyboard moves along the first direction relatively to the second body, the keyboard drives the fourth supporting point to move in the second chute.

7. The electronic apparatus as claimed in claim 5, wherein each of the keyboard linkage further comprises a second torque part disposed at the third supporting point, and the second torque part is used to fix an angle of the keyboard relative to the second body.

8. The electronic apparatus as claimed in claim 5, wherein the third supporting point is located at center of the corresponding side-edge of keyboard.

9. The electronic apparatus as claimed in claim 1, further comprising at least one transmission line, wherein the transmission line passes through keyboard linkage to make the keyboard electrically connected to the second body.

10. The electronic apparatus as claimed in claim 1, wherein two body side-edges of the second body adjacent to the keyboard respectively comprise a first positioning portion, two keyboard side-edges of the keyboard adjacent to the second body respectively and correspondingly comprise a second positioning portion, and the keyboard is able to fix position of the keyboard relative to the second body by means of inter-fixing of the second positioning portion and the first positioning portion.

11. A keyboard, adjacent to and movably connected to a second body of an electronic apparatus, wherein the keyboard is located at a side of the second body far away from the place where the second body is pivoted to a first body, the electronic apparatus comprises the first body and the second body, the first body has a first side and a display side opposite to each other, the second body is pivoted at the first body and has a second side facing the first body; at least one pair of body linkages are protruded from the first side of the first body and movably connected to the second body, and at least one pair of keyboard linkages are opposite to each other and movably disposed at two side-edges of the keyboard and two side-edges of the second body, and the keyboard has:

a keyboard side located at the same side of the second side, wherein when the first body is extended relatively to the second body, the keyboard is able to move along a first direction relatively to the second body, then clockwise move to a side of the second body where the second body is pivoted to the first body by means of the rotations of the pair of the keyboard linkages, and then to move along the first direction again to be fixed.

* * * * *